(12) United States Patent
Koya et al.

(10) Patent No.: US 12,380,886 B2
(45) Date of Patent: Aug. 5, 2025

(54) VOICE OPERATION DEVICE, VOICE OPERATION METHOD AND VOICE OPERATION PROGRAM

(71) Applicant: Nippon Telegraph and Telephone Corporation, Tokyo (JP)

(72) Inventors: Hidetaka Koya, Musashino (JP); Makoto Komiyama, Musashino (JP); Akira Kataoka, Musashino (JP); Masashi Tadokoro, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 351 days.

(21) Appl. No.: 18/013,451

(22) PCT Filed: Jul. 1, 2020

(86) PCT No.: PCT/JP2020/025914
§ 371 (c)(1),
(2) Date: Dec. 28, 2022

(87) PCT Pub. No.: WO2022/003879
PCT Pub. Date: Jan. 6, 2022

(65) Prior Publication Data
US 2023/0260508 A1 Aug. 17, 2023

(51) Int. Cl.
*G10L 15/22* (2006.01)
*G10L 15/26* (2006.01)

(52) U.S. Cl.
CPC .............. *G10L 15/22* (2013.01); *G10L 15/26* (2013.01); *G10L 2015/223* (2013.01); *G10L 2015/228* (2013.01)

(58) Field of Classification Search
None
See application file for complete search history.

(56) References Cited

U.S. PATENT DOCUMENTS 6,144,938 A * 11/2000 Surace ................ H04M 3/4936
704/E13.004
7,016,832 B2 * 3/2006 Choi ........................ G10L 25/93
704/214

(Continued)

FOREIGN PATENT DOCUMENTS

JP 2017087950 5/2017

OTHER PUBLICATIONS

[No Author Listed] [online], "Get the latest with Alexa," amazon.co.jp, retrieved on May 8, 2020, retrieved from URL <https://www.amazon.co.jp/b?ie=UTF8&node=4788676051>, 5 pages (with English Translation).

(Continued)

*Primary Examiner* — Neeraj Sharma
(74) *Attorney, Agent, or Firm* — Fish & Richardson P.C.

(57) ABSTRACT

A task determination unit determines a type of processing being operated, on the basis of an operation situation of an existing system. A conversion unit converts voice data input during a predetermined operation of an HID into text data, and determines whether the text data is used for a command determination or a setting parameter according to operation content of the HID. A command determination unit determines a command by using the text data and the type of processing being operated, when it is determined that the text data is used for the command determination. An operation unit executes an operation corresponding to the determined command with respect to the existing system by using the text data as a parameter, when it is determined that the text data is used for the setting parameter.

5 Claims, 11 Drawing Sheets

(56) References Cited

U.S. PATENT DOCUMENTS

| | | | | |
|---|---|---|---|---|
| 8,478,587 B2* | 7/2013 | Kawamura | ............ | G10L 15/02 |
| | | | | 704/226 |
| 11,373,459 B2* | 6/2022 | Ohmert | ................... | G06F 9/541 |
| 11,551,675 B2* | 1/2023 | Indurthi | ................ | G10L 15/16 |
| 2004/0225650 A1* | 11/2004 | Cooper | ................... | G10L 13/00 |
| 2005/0033582 A1* | 2/2005 | Gadd | ..................... | G10L 15/26 |
| | | | | 704/E15.04 |
| 2005/0259834 A1* | 11/2005 | Ariav | ...................... | G10L 15/26 |
| | | | | 704/275 |
| 2008/0189513 A1* | 8/2008 | Hutson | ................ | G06F 9/3836 |
| | | | | 712/7 |
| 2012/0121096 A1* | 5/2012 | Chen | .................. | G10L 21/0364 |
| | | | | 704/226 |
| 2013/0290000 A1* | 10/2013 | Newman | ................ | G10L 25/51 |
| | | | | 704/E21.001 |
| 2021/0125618 A1* | 4/2021 | Martínez González | ..................... | |
| | | | | G10L 17/04 |
| 2021/0127014 A1* | 4/2021 | Kumar | ............... | H04M 7/0084 |

OTHER PUBLICATIONS

Microsoft Corporation, "Windows speech recognition commands," Windows support, retrieved on May 8, 2020, retrieved from URL <https://support.microsoft.com/ja-jp/help/12427/windows-speech-recognition-commands>, 27 pages (with English Translation).

* cited by examiner

Fig. 2

| TASK CONDITION | | COMMAND CONDITION | | OPERATION SETTING |
|---|---|---|---|---|
| TASK NAME | DETERMINATION CONDITION | COMMAND NAME | DETERMINATION CONDITION | |
| TASK A | DETERMINATION CONDITION A | COMMAND $\alpha$ | DETERMINATION CONDITION $\alpha$ | OPERATION SETTING A-$\alpha$ |
| | | COMMAND $\beta$ | DETERMINATION CONDITION $\beta$ | OPERATION SETTING A-$\beta$ |
| | | COMMAND $\gamma$ | DETERMINATION CONDITION $\gamma$ | OPERATION SETTING A-$\gamma$ |
| TASK B | DETERMINATION CONDITION B | COMMAND $\alpha$ | DETERMINATION CONDITION $\alpha$ | OPERATION SETTING B-$\alpha$ |
| | | COMMAND $\theta$ | DETERMINATION CONDITION $\theta$ | OPERATION SETTING B-$\theta$ |
| ... | ... | ... | ... | ... |

14a

VOICE OPERATION DEVICE, VOICE OPERATION METHOD AND VOICE OPERATION PROGRAM

CROSS-REFERENCE TO RELATED APPLICATIONS

This application is a National Stage application under 35 U.S.C. § 371 of International Application No. PCT/JP2020/025914, having an International Filing Date of Jul. 1, 2020, the disclosure of which is considered part of the disclosure of this application, and is incorporated by reference in its entirety into this application.

TECHNICAL FIELD

The present invention relates to a voice operation device, a voice operation method, and a voice operation program.

BACKGROUND ART

In recent years, voice user interface (VUI) has been attracting attention due to the dramatic improvement in voice recognition and natural language processing. For example, VUI is utilized for voice-based home appliance operation (Home Automation), and operation of in-vehicle functions while driving (see PTL 1, NPL 1, and NPL 2).

CITATION LIST

Patent Literature

[PTL 1] Japanese Patent Application Publication No. 2017-87950

Non Patent Literature

[NPL 1] "Windows Speech Recognition Commands", [online], Microsoft, [retrieved on May 8, 2020], Internet <URL: https://support.microsoft.com/ja-jp/help/12427/windows-speech-recognition-commands>
[NPL 2] "Alexa Skills: Let's listen to the latest information on Alexa", [online], amazon, [retrieved on May 8, 2020], Internet <URL: https://www.amazon.co.jp/b?ie=UTF8&node=4788676051>

SUMMARY OF THE INVENTION

Technical Problem

However, with the related art, it may be difficult to add any voice operation functions to an existing system. For example, many VUIs of the related art only call default voice commands, and it is necessary to hard-code a program in order to perform a unique voice operation according to a task of a user. Further, a voice command that matches an utterance and an application is merely executed without considering a situation of a user who has made an utterance. Therefore, it is necessary to define different voice commands for different tasks, and there are many voice commands.

The present invention has been made in view of the above and an object of the present invention is to add any voice operation functions to an existing system.

Means for Solving the Problem

In order to solve the above-described problem and achieve the object, a voice operation device according to the present invention includes: a task determination unit configured to determine a type of processing being operated, on the basis of an operation situation of an existing system; a conversion unit configured to convert voice data input during a predetermined operation of a human interface device (HID) into text data, and determine whether the text data is used for command determination or a setting parameter according to operation content of the HID; a command determination unit configured to determine a command by using the text data and the type of processing being operated, when it is determined that the text data is used for the command determination; and an operation unit configured to execute an operation corresponding to the determined command with respect to the existing system by using the text data as a parameter, when it is determined that the text data is used for the setting parameter.

Effects of the Invention

According to the present invention, it is possible to add any voice operation functions to an existing system.

BRIEF DESCRIPTION OF DRAWINGS

FIG. 2 is a diagram illustrating a data structure of the rule.

DESCRIPTION OF EMBODIMENTS

Hereinafter, an embodiment of the present invention will be described in detail with reference to the drawings. The present invention is not limited to the present embodiment. Further, in the description of the drawings, the same parts are denoted by the same reference signs.

Figure 1:
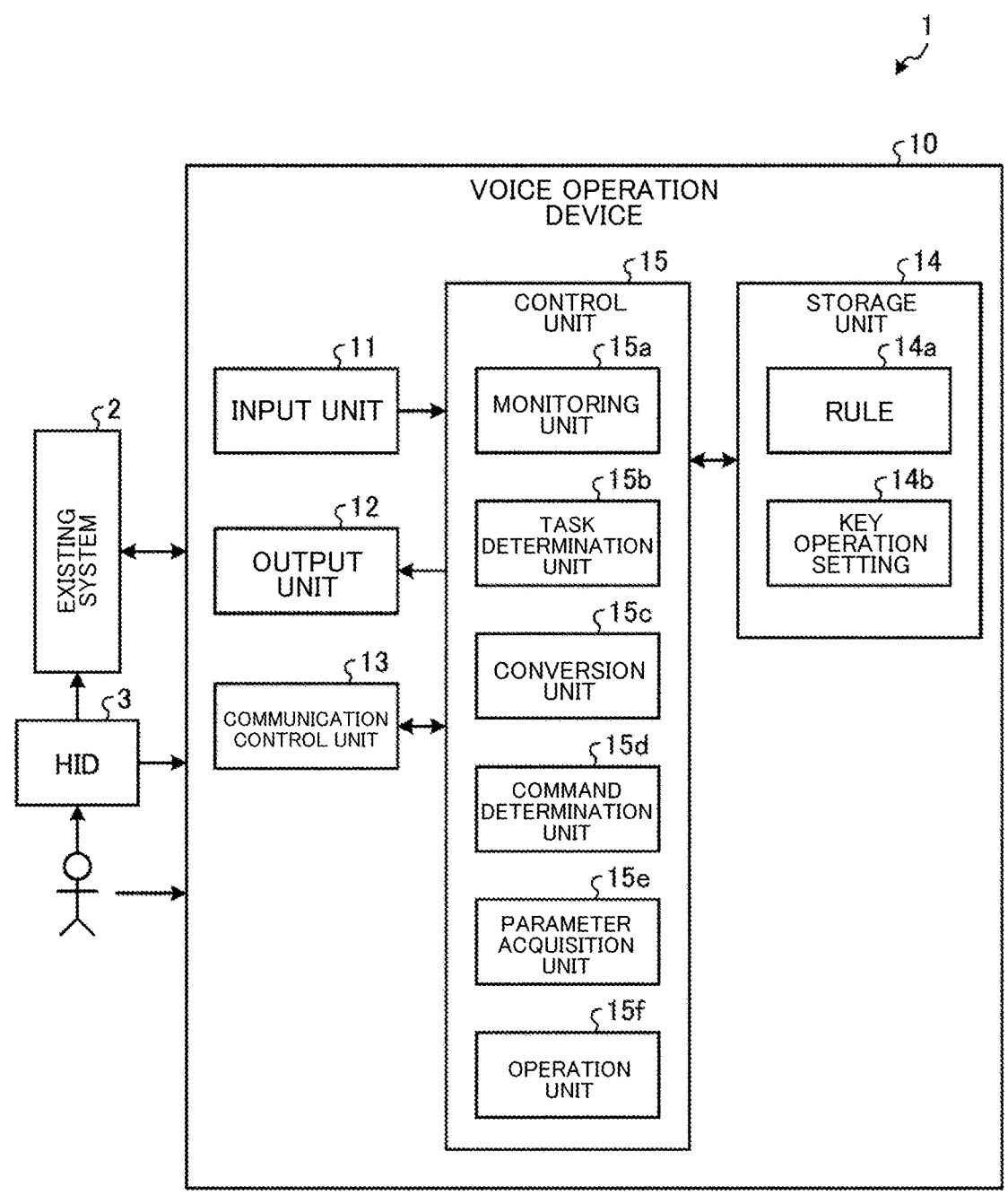
FIG. 1 is a schematic diagram illustrating a schematic configuration of a voice operation device of the embodiment.

[Configuration of Voice Control Device]
FIG. 1 is a schematic diagram illustrating a schematic configuration of a voice operation device of the present embodiment. As illustrated in FIG. 1, the voice operation device 10 of the present embodiment is realized by a general-purpose computer such as a personal computer, and includes an input unit 11, an output unit 12, a communication control unit 13, a storage unit 14, and a control unit 15.

The input unit 11 is realized by using an input device such as a keyboard, a mouse, or a microphone, and inputs various types of instruction information, such as processing start, to the control unit 15 in response to an input operation by an operator. Further, the input unit 11 inputs a voice of the user who operates the existing system 2 via an HID 3.

The output unit 12 is realized by a display device such as a liquid crystal display, a printing device such as a printer, or the like. For example, the output unit 12 displays, for example, text data converted from an utterance of the user in voice operation processing to be described below.

The communication control unit 13 is realized by a network interface card (NIC) or the like, and controls communication between an external device and the control unit 15 that is performed via a telecommunication line such as a local area network (LAN) or the Internet. For example, the communication control unit 13 controls communication between the existing system 2 that is a target of the voice operation processing to be described below or the human interface device (HID) 3 to be used by a user who operates the existing system 2 and the control unit 15.

The storage unit 14 is realized by, for example, a semiconductor memory element such as a random access memory (RAM) or a flash memory, or a storage device such as a hard disk or an optical disc. A processing program for operating the voice operation device 10, data to be used during execution of the processing program, and the like are stored in the storage unit 14 in advance or are temporarily stored each time processing is performed. The storage unit 14 may be configured to communicate with the control unit 15 via the communication control unit 13.

In the present embodiment, the storage unit 14 stores, for example, a rule 14a and a key operation setting 14b. These pieces of information are created by the user, for example, prior to the voice operation processing to be described below, and are stored in the storage unit 14 via the input unit 11 or the communication control unit 13.

Figure 3:
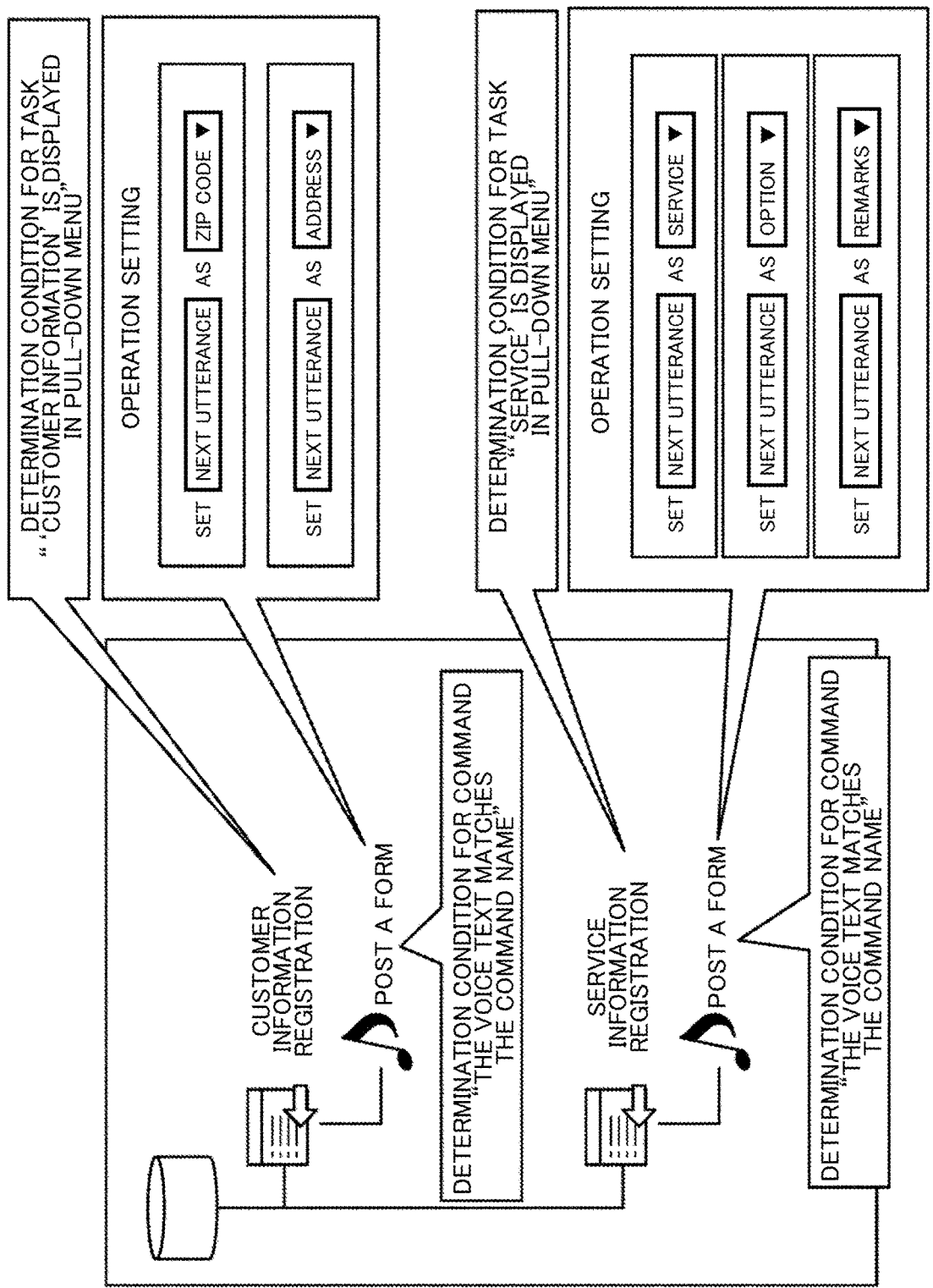
FIG. 3 is a diagram illustrating the rule.

Here, FIG. 2 is a diagram illustrating a data structure of the rule 14a. Further, FIG. 3 is a diagram illustrating the rule 14a. As illustrated in FIG. 2, the rule 14a is information for determining a type of processing and a command corresponding to the type of processing. In the present embodiment, the type of processing means work that is being operated by the user.

Specifically, the rule 14a includes task conditions and command conditions. In the example illustrated in FIG. 2, the task conditions include, for example, task A, and determination condition A thereof, and command conditions corresponding to task A include command a, command R, command y, and determination condition a, determination condition and determination condition y of the respective commands.

Further, the rule 14a includes an operation setting that is information for designating a parameter that is set in correspondence to the command. In the example illustrated in FIG. 2, operation setting A-a are included in correspondence to the command a.

Specifically, each element of the rule 14a is set as illustrated in FIG. 3. In the example illustrated in FIG. 3, for example, tasks are "customer information registration" and "service information registration". For example, "'customer information' is displayed in a pull-down menu" is set as a determination condition for the task "customer information registration". Further, as a determination condition for the task "service information registration", "'service' is displayed in a pull-down menu" is set.

Further, a command corresponding to the task "customer information registration" is, for example, "post a form", and "the voice text matches the command name" is set as a determination condition for this command "post a form". Further, a command corresponding to the task "service information registration" is also "post a form", and "the voice text matches the command name" is set as a determination condition for this command.

Further, for example, an operation setting for designating a parameter to be set in the command "post a form" of the task "customer information registration" is illustrated in FIG. 3. It is shown that this operation setting is "set the next utterance as a UI 'zip code'" and "set the next utterance as an UI 'address'".

Description will return to FIG. 1. The key operation setting 14b is information for specifying the operation content of the HID for determining whether the text data converted by the conversion unit 15c to be described below is used for a command determination or a setting parameter.

Figure 4:
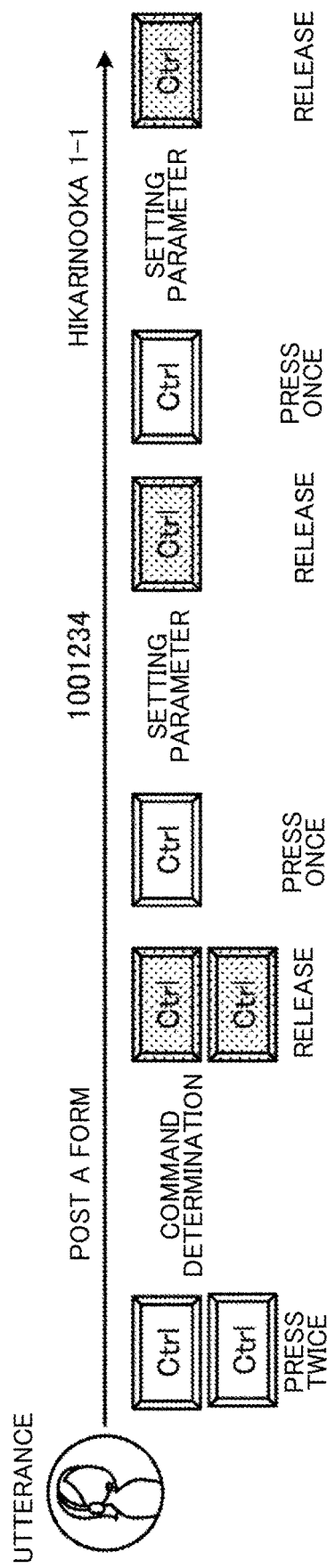
FIG. 4 is a diagram illustrating key operation settings.

Here, FIG. 4 is a diagram illustrating a key operation setting. In an example illustrated in FIG. 4, it is designated using the key operation setting 14b that, for example, a voice input until a control key is released after the control key is pressed twice is converted into text data, and the text data is used for a command determination to be described below. Further, it is designated that a voice input until the control key is released after the control key is pressed once is converted into text data, and the text data is used for the setting parameter to be described below.

Description will return to FIG. 1. The control unit 15 is realized by using a central processing unit (CPU) or the like, and executes a processing program stored in a memory. Accordingly, the control unit 15 functions as a monitoring unit 15a, a task determination unit 15b, a conversion unit 15c, a command determination unit 15d, a parameter acquisition unit 15e, and an operation unit 15f, as illustrated in FIG. 1. The respective functional units or some of the functional units may be mounted in different hardware. For example, the monitoring unit 15a and the task determination unit 15b may be mounted on hardware different from other functional units. Further, the control unit 15 may include other functional units.

The monitoring unit 15a monitors an operation situation of the existing system 2. For example, the monitoring unit 15a monitors a window title, a display of a pull-down menu, and the like of software that is being operated by the user. The monitoring unit 15a notifies the task determination unit 15b of the operation situation periodically or at an appropriate timing such as a timing when the voice operation processing to be described below has been started.

The task determination unit 15b determines the type of processing being operated on the basis of the operation situation of the existing system 2. Specifically, the task determination unit 15b determines the task being operated by the user by using the operation situation notified of from the monitoring unit 15a and the task condition of the rule 14a.

For example, when the operation situation "display of the pull-down menu is 'customer information'" is notified of from the monitoring unit 15a, the task determination unit 15b compares the operation situation "display of the pull-down menu is 'customer information'" with a determination condition "'customer information' is displayed in a pull-down menu" for the task "customer information registration" in the example illustrated in FIG. 3. Since the operation situation matches the determination condition for the task, the task determination unit 15b determines that the task being operated is the "customer information registration".

Similarly, since the operation situation "display of the pull-down menu is 'service'" matches the determination condition "'service' is displayed in a pull-down menu" for the task "service information registration" when the operation situation "display of the pull-down menu is 'service'" is notified of, the task determination unit 15b determines that the task being operated is the "service information registration".

The conversion unit 15c converts voice data input during a predetermined operation of the HID 3 into text data, and determines whether the text data is used for the command determination or the setting parameter according to operation content of the HID 3. Specifically, when the conversion unit 15c refers to the key operation setting 14b and detects the operation content of the HID 3 specified by the key operation setting 14b, the conversion unit 15c inputs voice data input via the input unit 11 into, for example, text data using an existing API or the like. Further, the conversion unit 15c determines whether the converted text data is used for the command determination or the setting parameter according to the detected operation content of the HID 3.

For example, the conversion unit 15c converts voice data "post a form" input until a control key is released after the control key is pressed twice into text data, and uses the text data for the command determination, in the example illustrated in FIG. 4. Further, the conversion unit 15c converts voice data "1001234" input until the control key is released after the control key is pressed once into text data, and determines that the text data is used for the setting parameter. Further, the conversion unit 15c converts voice data "Hikarinooka 1-1" input until the control key is released after the control key is pressed once into text data, and determines that the text data is used for the next setting parameter.

When the conversion unit 15c determines that the text data is used for the command determination, the conversion unit 15c transmits text data to the command determination unit 15d to be described below. When the conversion unit 15c determines that the text data is used for the setting parameter, the conversion unit 15c transmits text data to the parameter acquisition unit 15e to be described below.

When it is determined that the text data is used for the command determination, the command determination unit 15d determines the command using the text data and the type of processing being operated. Specifically, the command determination unit 15d refers to the rule 14a and determines the command by using the determination condition for the command corresponding to the task determined by the task determination unit 15b, and the text data.

For example, the command determination unit 15d determines that a command of the text data is "post a form" when the determination condition "the voice text matches the command name" for the command "post a form" corresponding to the task "customer information registration" matches the text data "post a form", in the example illustrated in FIG. 3.

The parameter acquisition unit 15e acquires the text data as a parameter when it is determined that the text data is used for the setting parameter. Further, the operation unit 15f executes an operation corresponding to the determined command with respect to the existing system 2 by using the acquired parameter.

Specifically, the parameter acquisition unit 15e holds the text data acquired from the conversion unit 15c in a data structure that is in a queue format, and returns a value to the operation unit 15f through First In First Out (FIFO) in correspondence to an operation "acquire the next utterance". Further, the operation unit 15f performs an operation of a command with respect to the existing system 2 with the text data acquired by the parameter acquisition unit 15e as a parameter of the determined command, according to the operation setting of the rule 14a.

Figure 5:
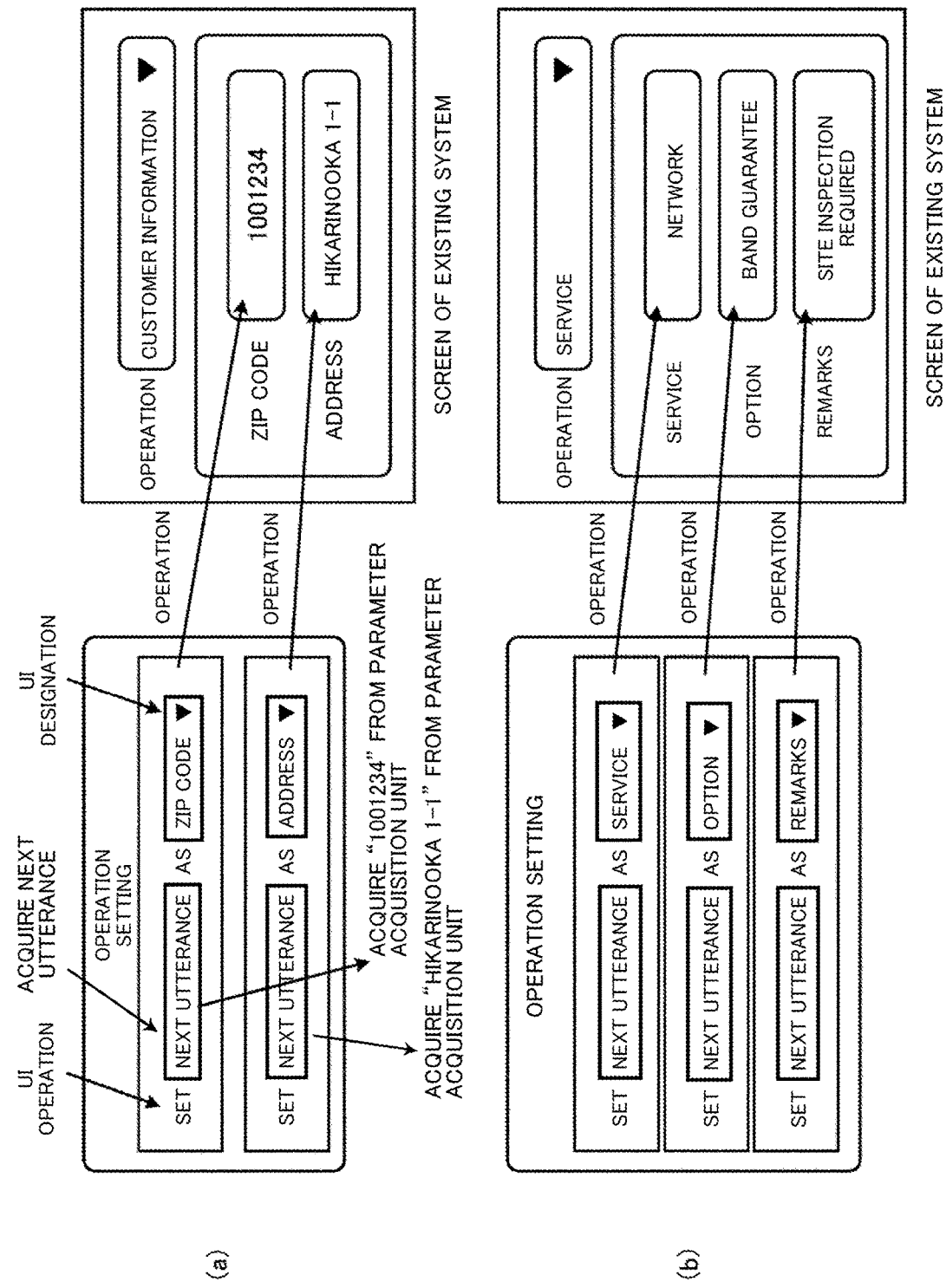
FIG. 5 is a diagram illustrating processing of an operation unit.

Here, FIG. 5 is a diagram illustrating processing of the operation unit. In an example illustrated in FIG. 5(a), the operation setting includes operations such as "acquire the next utterance", "UI designation", and "UI operation". It is designated that the text data (corresponding to "next utterance" in FIG. 5(a)) determined to be used for the setting parameter is acquired and a UI operation "set" the text data as the UI "zip code" is performed. Further, it is designated that the next text data (next utterance) is set as a UI "address".

The operation unit 15f sets text data "1001234" determined to be used for the setting parameter as a UI "zip code" of a screen of the task "customer information registration" of the existing system 2 according to the operation of the HID 3 illustrated in FIG. 4. Further, the operation unit 15f sets the next text data "Hikarinooka 1-1" as an UI "address" of the same screen.

Similarly, the operation unit 15f sets text data "network" as a UI "service" of a screen of the task "service information registration" of the existing system 2, in the example illustrated in FIG. 5(b). Further, the operation unit 15f sets the next text data "band guarantee" as a UI "option" of the same screen. Further, the operation unit 15f sets the next text data "site inspection required" as a UI "remarks" of the same screen.

Thus, the operation unit 15f operates a UI of the existing system 2 according to the operation setting defined in the rule 14a. Further, in FIGS. 5(a) and 5(b), even when the same command "post a form" is used, operations are executed appropriately according to different operation settings corresponding to different tasks of the "customer information registration" and the "service information registration", as illustrated in FIG. 3.

[Voice Operation Processing]

Figure 6:
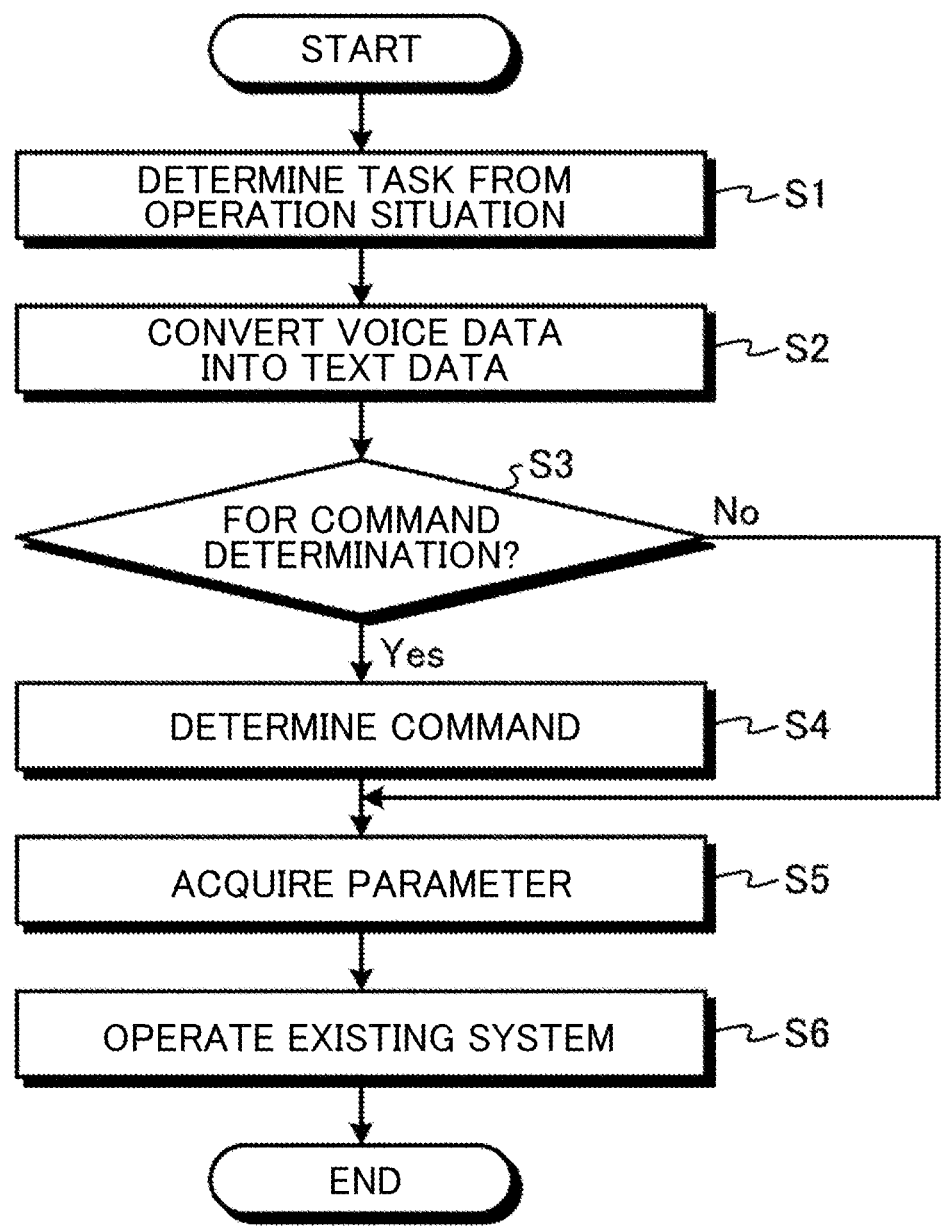
FIG. 6 is a flowchart illustrating a voice operation processing procedure.

Next, voice operation processing in the voice operation device 10 according to the present embodiment will be described with reference to FIGS. 6 to 10. FIGS. 6 to 10 are flowcharts illustrating a voice operation processing procedure. First, the flowchart of FIG. 6 is started, for example, at a timing when the user performs an operation input for starting a voice operation using the HID 3.

First, the task determination unit 15b determines the task being operated by the user using the operation situation notified of from the monitoring unit 15a and the task condition of the rule 14a (step S1).

Then, the conversion unit 15c converts the voice data input during the predetermined operation of the HID 3 into text data, and determines whether the text data is used for the command determination or the setting parameter depending on the operation content of the HID 3 (steps S2 and S3).

When the conversion unit 15c determines that the text data is used for the command determination (step S3: Yes), the command determination unit 15d determines the command using the text data and the type of processing being operated (step S4).

On the other hand, when the conversion unit 15c determines that the text data is used for the setting parameter (step S3: No), the parameter acquisition unit 15e acquires the text data as a parameter (step S5). Further, the operation unit 15f executes the operation corresponding to the determined command with respect to the existing system 2 using the acquired parameter (step S6). Accordingly, a series of voice operation processing ends.

Figure 7:
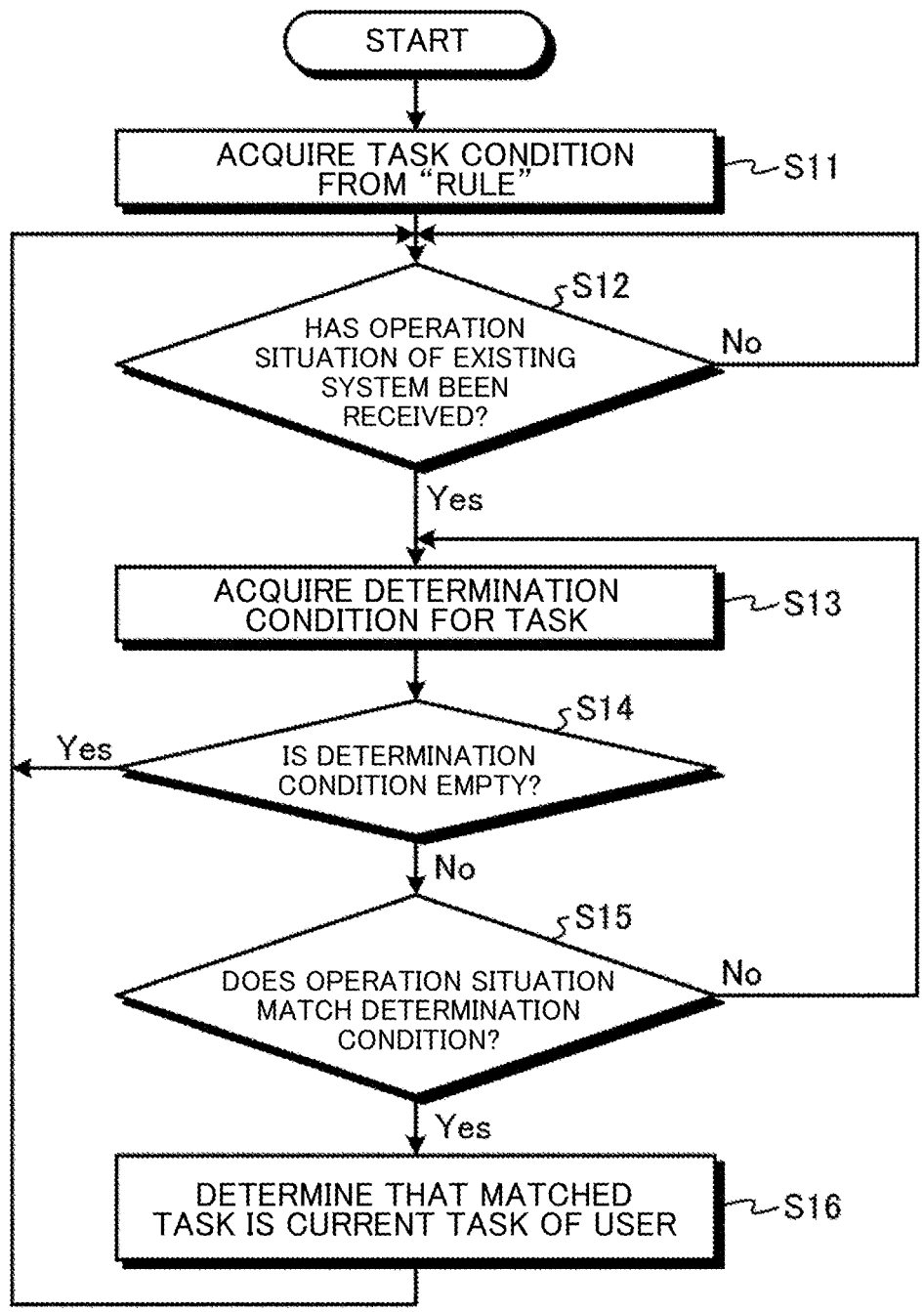
FIG. 7 is a flowchart illustrating a voice operation processing procedure.

Next, FIG. 7 illustrates a detailed procedure of the processing of the above step S1. The task determination unit 15b acquires the task condition of the rule 14a (step S11) and waits for reception of the operation situation of the existing system 2 (step S12: No). When the operation situations are received (step S12: Yes), the task determination unit 15*b* refers to the tasks of the task conditions of the rule 14*a* in order to acquire the determination condition corresponding to the task (step S13).

When the acquired determination condition is empty (step S14: Yes), the task determination unit 15*b* returns the processing to step S12. On the other hand, when the determination condition is not empty (step S14: No), the task determination unit 15*b* confirms whether or not the operation situation matches the determination condition for the task (step S15).

When the operation situation does not match the determination condition for the task (step S15: No), the task determination unit 15*b* returns the processing to step S13. On the other hand, when the operation situation matches the determination condition for the task (step S15: Yes), the task determination unit 15*b* determines that the matched task is a current task being operated by the user (step S16) and returns the processing to step S12.

Figure 8:
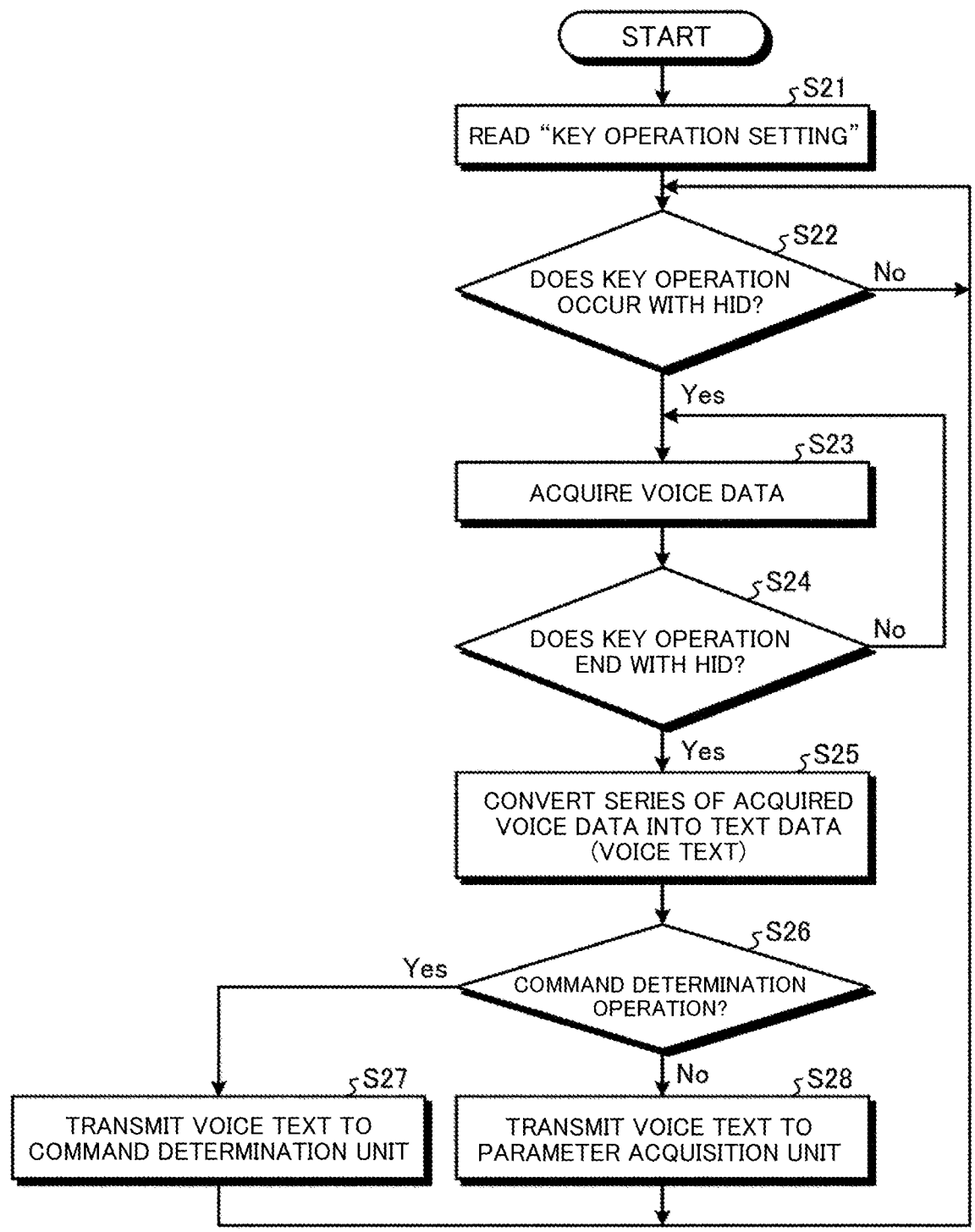
FIG. 8 is a flowchart illustrating a voice operation processing procedure.

Further, FIG. 8 illustrates a detailed procedure of the processing of the above steps S2 and S3. The conversion unit 15*c* reads the key operation setting 14*b* (step S21) and waits for occurrence of a key operation in the HID 3 (step S22: No). When the key operation occurs (step S22: Yes), the conversion unit 15*c* acquires voice data of the user (step S23) and waits for ending of the key operation in the HID 3 (step S24: No).

When the key operation ends (step S24: Yes), the conversion unit 15*c* converts the acquired voice data into text data (voice text) (step S25).

When the key operation is an operation for designating that the voice text is used for the command determination (step S26: Yes), the conversion unit 15*c* transmits the voice text to the command determination unit 15*d* (step S27) and returns the processing to step S22.

On the other hand, when the key operation is an operation for designating that the voice text is used for the setting parameter (step S26: No), the conversion unit 15*c* transmits the voice text to the parameter acquisition unit 15*e* (step S28) and returns the processing to step S22.

Figure 9:
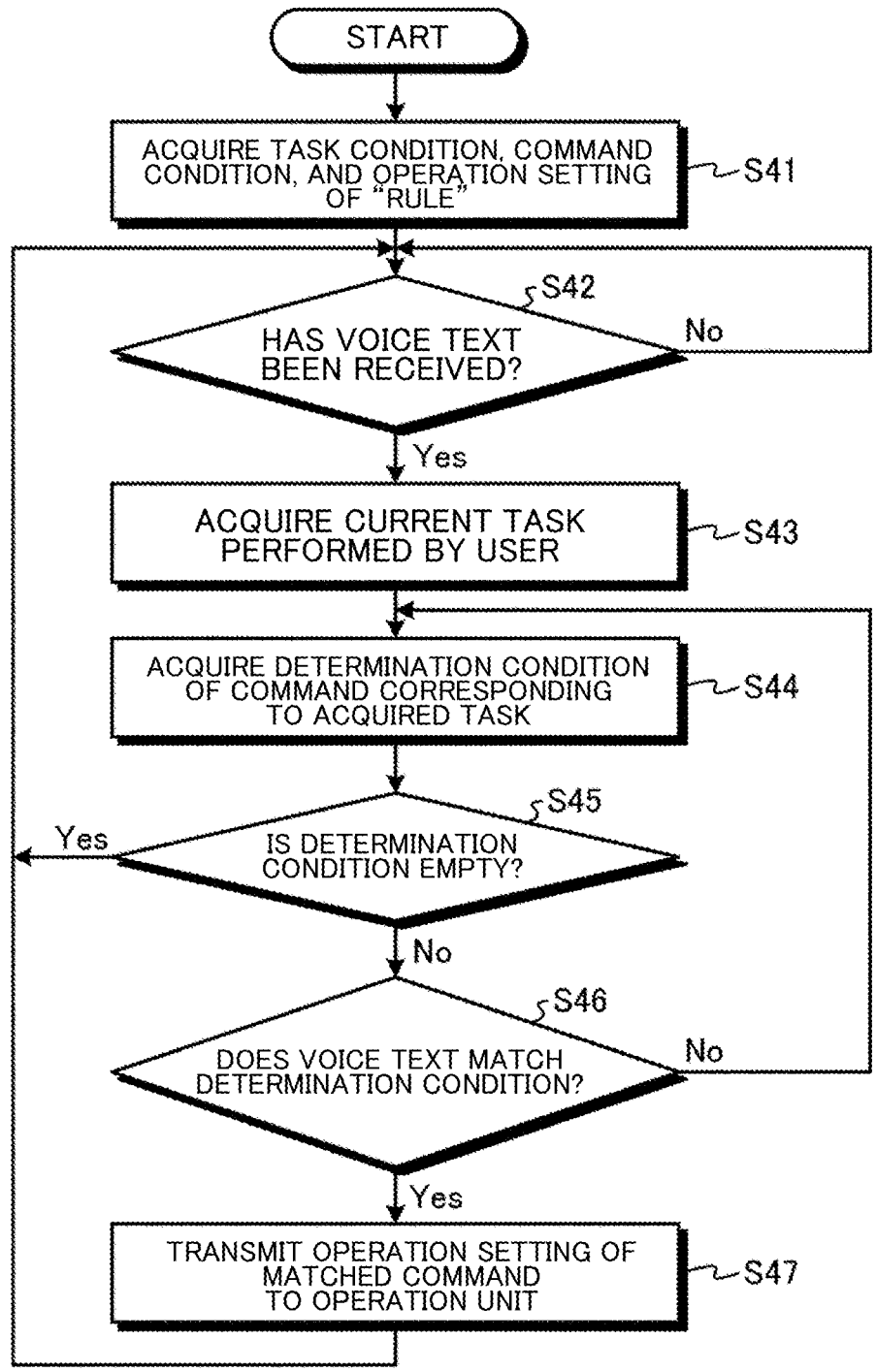
FIG. 9 is a flowchart illustrating a voice operation processing procedure.

FIG. 9 illustrates a detailed procedure of the processing of the above step S4. The command determination unit 15*d* acquires the task condition, the command condition, and the operation setting of the rule 14*a* (step S41), and waits for reception of the voice text (step S42: No). When the voice text is received (step S42: Yes), the command determination unit 15*d* acquires a current task of the user from the task determination unit 15*b* (step S43).

Further, the command determination unit 15*d* refers to the commands of the command conditions corresponding to the task of the rule 14*a* in order to acquire the determination conditions corresponding to the commands (step S44).

When the acquired determination condition is empty (step S45: Yes), the command determination unit 15*d* returns the processing to step S42. On the other hand, when the determination condition is not empty (step S45: No), the command determination unit 15*d* confirms whether or not the voice text matches the command determination condition (step S46).

When the voice text does not match the command determination condition (step S46: No), the command determination unit 15*d* returns the processing to step S44. On the other hand, when the voice text matches the command determination condition (step S46: Yes), the command determination unit 15*d* transmits an operation setting corresponding to the matched command to the operation unit 15*f* (step S47) and returns the processing to step S42.

Figure 10:
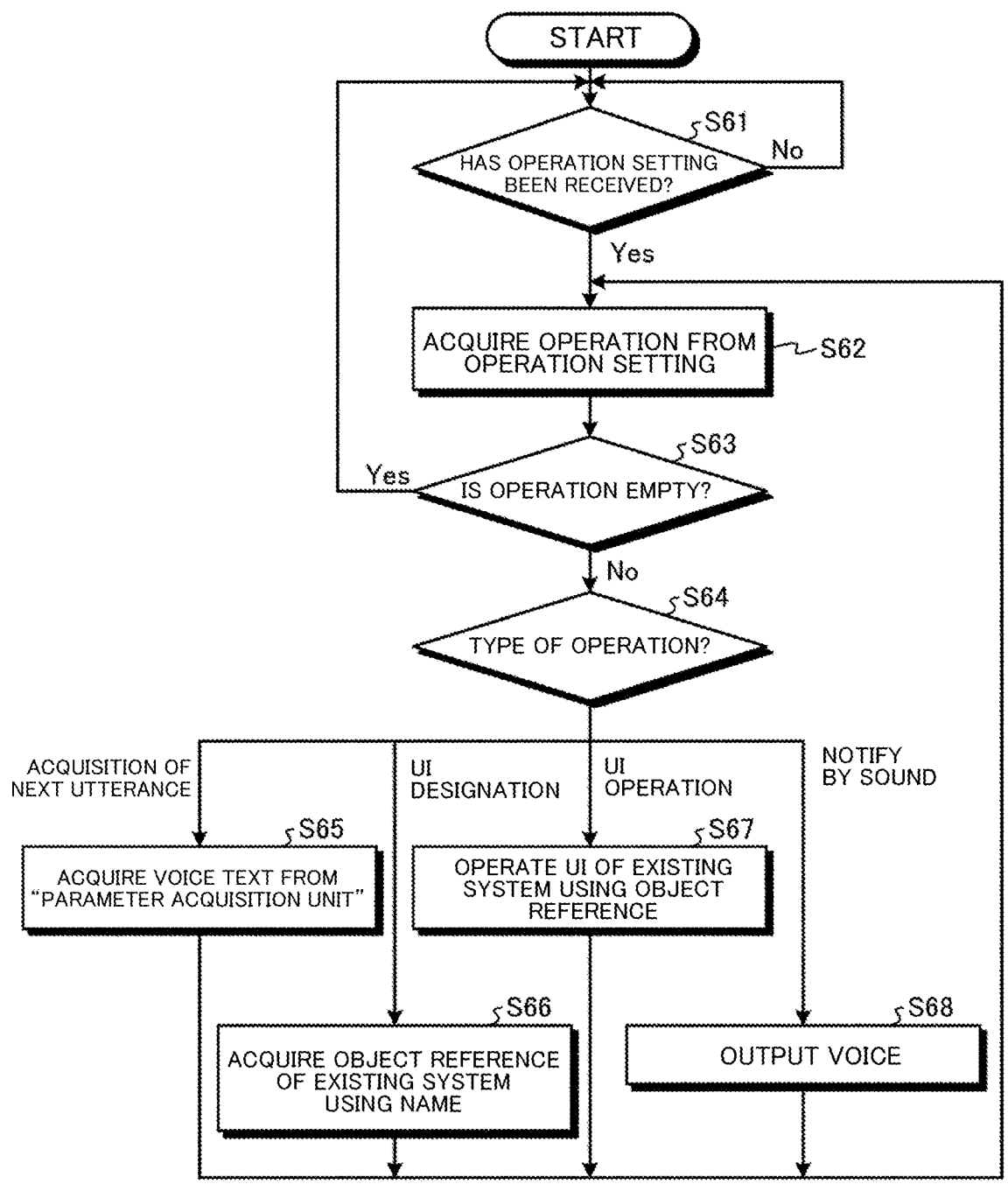
FIG. 10 is a flowchart illustrating a voice operation processing procedure.

FIG. 10 illustrates a detailed procedure of the processing of the above step S6. The operation unit 15*f* waits for reception of the operation setting of the command from the command determination unit 15*d* (step S61: No). When the operation settings are received (step S61: Yes), the operation unit 15*f* acquires operations of the operation settings of the commands in order (step S62).

When the acquired operation is empty (step S63: Yes), the operation unit 15*f* returns the processing to step S61. On the other hand, when the operation is not empty (step S63: No), the operation unit 15*f* confirms a type of operation (step S64) and executes an operation according to the type.

When the type of operation is "acquire the next utterance", the operation unit 15*f* acquires the voice text from the parameter acquisition unit 15*e* (step S65) and returns the processing to step S62.

When the type of operation is "UI designation", the operation unit 15*f* acquires the object reference of the existing system 2 on the basis of a name (step S66) and returns the processing to step S62.

Here, the object reference is information for uniquely specifying a UI such as a button or a text box of the existing system 2. For example, when the existing system 2 is a web-based system, the object reference is an element of a document object model (DOM). Further, when the existing system 2 is a native application such as a calculator application of Windows (registered trademark), the object reference is an Autmation element of UI Autmation. The operation unit 15*f* can execute an operation with respect to the existing system 2 by using the object reference.

When the type of operation is "UI operation", the operation unit 15*f* operates the UI of the existing system 2 using the object reference (step S67), and returns the processing to step S62.

When the type of operation is "notification by sound", the operation unit 15*f* outputs a voice (step S68) and returns the processing to step S62.

As described above, in the voice operation device 10 of the present embodiment, the task determination unit 15*b* determines the type of processing being operated, on the basis of the operation situation of the existing system 2. Further, the conversion unit 15*c* converts the voice data input during the predetermined operation of the HID 3 into text data, and determines whether the text data is used for the command determination or the setting parameter according to the operation content of the HID 3. Further, when the command determination unit 15*d* determines that the text data is used for the command determination, the command determination unit 15*d* determines the command by using the text data and the type of processing being operated. Further, when it is determined that the text data is used for the setting parameter, the operation unit 15*f* uses the text data as a parameter to execute the operation corresponding to the determined command with respect to the existing system 2.

Accordingly, the voice operation device 10 is not limited to defined voice commands that have been set in advance, and any voice operation functions can be additionally applied. In particular, since the voice operation is performed with an operation of the HID 3 as a starting point, it is possible to realize the voice operation without disturbing a flow of task during the operation, as in a case in which a voice operation with a voice as a starting point is used together during the operation. Further, since the voice command is determined in consideration of a situation of a task of the user or the like, an increase in types of voice commands can be curbed and the voice operation function can be efficiently realized. Further, since an association between the command and a large number of parameters can be flexibly set, the voice operation function can be easily realized.

For example, handwritten input fields of a printed paper form are read from above so that text can be input to corresponding input fields of the system. Alternatively, the handwritten input fields of the printed paper form are read from above and compared with content set in the corresponding input fields of the system so that an error can be notified of when there is a discrepancy. Thus, according to the voice operation device 10, it is possible to add any voice operation functions to the existing system without the need for hard coating of a program.

Further, the storage unit 14 stores the rule 14*a* for determining the type of processing and the command corresponding to the type of processing. Further, the rule 14*a* includes the information for designating a parameter that is set in correspondence to the command. This makes it easy for the user to add a voice operation function in detail.

Further, the storage unit 14 stores the key operation setting 14*b* for specifying the operation content of the HID to determine whether text data obtained by converting a voice is used for the command determination or the setting parameter. This makes it possible to easily extract a voice to be used for a voice operation without using morphological analysis or the like.

Further, the monitoring unit 15*a* monitors the operation situation of the existing system 2. This makes it possible to rapidly ascertain a processing situation of the existing system 2 by the user and perform a highly accurate voice operation.

[Program]

It is also possible to create a program in which processing to be executed by the voice operation device 10 according to the above embodiment is described in a language that can be executed by a computer. As an embodiment, the voice operation device 10 can be mounted by a voice operation program executing the voice operation processing being installed as packaged software or online software in a desired computer. For example, an information processing device can be caused to function as the voice operation device 10 by the information processing device being caused to execute the voice operation program. The information processing device described here includes a desktop or laptop personal computer. Further, a mobile communication terminal such as a smart phone, a mobile phone, or a personal handyphone system (PHS), or a slate terminal such as a personal digital assistant (PDA), for example, is included in a category of the information processing device. Further, a function of the voice operation device 10 may be mounted in a cloud server.

Figure 11:
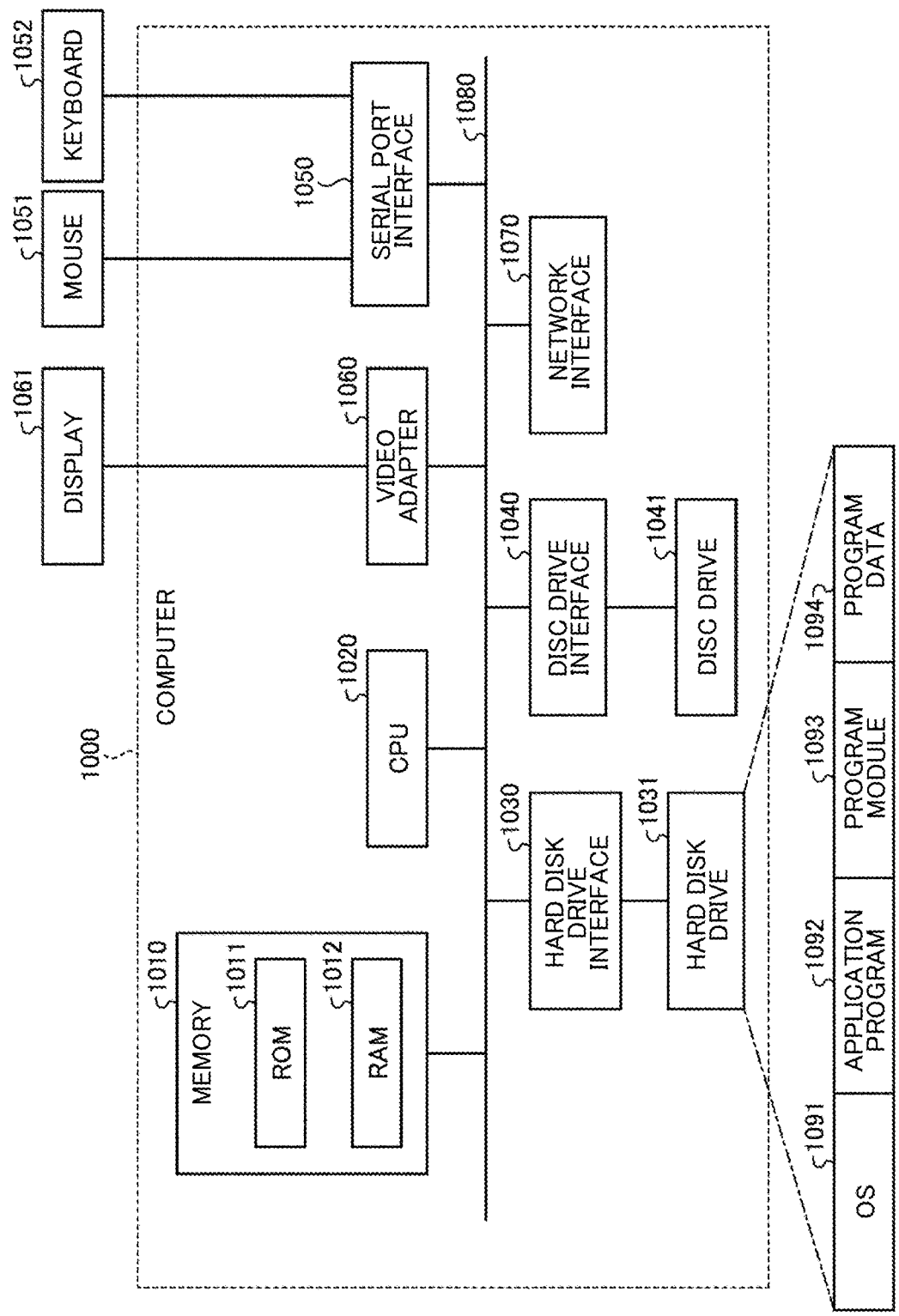
FIG. 11 is a diagram illustrating an example of a computer that executes a voice operation program.

FIG. 11 is a diagram illustrating an example of a computer that executes a voice operation program. A computer 1000 includes, for example, a memory 1010, a CPU 1020, a hard disk drive interface 1030, a disc drive interface 1040, a serial port interface 1050, a video adapter 1060, and a network interface 1070. These units are connected by a bus 1080.

The memory 1010 includes a read only memory (ROM) 1011 and a RAM 1012. The ROM 1011 stores, for example, a boot program, such as a basic input output system (BIOS). The hard disk drive interface 1030 is connected to a hard disk drive 1031. The disc drive interface 1040 is connected to a disc drive 1041. A detachable storage medium such as a magnetic disk or an optical disc, for example, is inserted into the disc drive 1041. A mouse 1051 and a keyboard 1052, for example, are connected to the serial port interface 1050. A display 1061, for example, is connected to the video adapter 1060.

Here, the hard disk drive 1031 stores, for example, an OS 1091, an application program 1092, a program module 1093, and program data 1094. Each of the pieces of information described in the above embodiment is stored in, for example, the hard disk drive 1031 or the memory 1010.

Further, the voice operation program, for example, is stored in the hard disk drive 1031 as the program module 1093 in which commands to be executed by the computer 1000 has been described. Specifically, the program module 1093 in which each processing to be executed by the voice operation device 10 described in the above embodiment has been described is stored in the hard disk drive 1031.

Further, data used for information processing by the voice operation program is stored as the program data 1094 in, for example, the hard disk drive 1031. The CPU 1020 reads the program module 1093 or the program data 1094 stored in the hard disk drive 1031 into the RAM 1012, as necessary, and executes each of the above-described procedures.

The program module 1093 or the program data 1094 relevant to the voice operation program is not limited to a case in which the program module 1093 or the program data 1094 are stored in the hard disk drive 1031 and, for example, may be stored in a detachable storage medium and read by the CPU 1020 via the disc drive 1041 or the like. Alternatively, the program module 1093 or the program data 1094 relevant to the voice operation program may be stored in another computer connected via a network such as a LAN or a wide area network (WAN) and read by the CPU 1020 via the network interface 1070.

Although the embodiment to which the invention made by the present inventor has been applied has been described above, the present invention is not limited by the description and the drawings that form a part of the disclosure of the present invention according to the present embodiment. That is, other embodiments, examples, operational techniques, and the like made by those skilled in the art or the like on the basis of the present embodiment are all included in the category of the present invention.

REFERENCE SIGNS LIST

10 Voice control device
11 Input unit
12 Output unit
13 Communication control unit
14 Storage unit
14*a* Rule
14*b* Key operation setting
15 Control unit
15*a* Monitoring unit
15*b* Task determination unit
15*c* Conversion unit
15*d* Command determination unit
15*e* Parameter acquisition unit
15*f* Operation unit

The invention claimed is:

1. A voice operation device comprising:
a processor configured to perform operations comprising:
determining a type of processing being operated, on a basis of an operation situation of an existing system;
converting voice data input during a predetermined operation of a human interface device (HID) into text data, and determine whether the text data is used for a command determination or a setting parameter according to operation content of the HID;

determining a command by using the text data and the type of processing being operated, in response to determining that the text data is used for the command determination; and executing an operation corresponding to the determined command with respect to the existing system by using the text data as a parameter, in response to determining that the text data is used for the setting parameter; and a memory configured to store a rule for determining the type of processing and the command corresponding to the type of processing, wherein the rule further includes information for designating a parameter to be set in correspondence to the command.

2. The voice operation device according to claim 1, further comprising a memory configured to store a key operation setting for specifying the operation content of the HID.

3. The voice operation device according to claim 1, further comprising a monitor configured to monitor the operation situation of the existing system.

4. A voice operation method executed by a voice operation device, the voice operation method comprising:

determining a type of processing being operated, on a basis of an operation situation of an existing system;

converting voice data input during a predetermined operation of a human interface device (HID) into text data, and determining whether the text data is used for a command determination or a setting parameter according to operation content of the HID;

determining a command by using the text data and the type of processing being operated, in response to determining that the text data is used for the command determination; and executing an operation corresponding to the determined command with respect to the existing system by using the text data as a parameter, in response to determining that the text data is used for the setting parameter, wherein:

determining the type of processing and the command corresponding to the type of processing is performed based on a rule stored in a memory, wherein the rule further includes information for designating a parameter to be set in correspondence to the command.

5. A non-transitory computer-readable medium storing program instructions that, when executed, cause a voice operation device to perform operations comprising:

determining a type of processing being operated, on a basis of an operation situation of an existing system;

converting voice data input during a predetermined operation of a human interface device (HID) into text data, and determining whether the text data is used for a command determination or a setting parameter according to operation content of the HID;

determining a command by using the text data and the type of processing being operated, in response to determining that the text data is used for the command determination; and executing an operation corresponding to the determined command with respect to the existing system by using the text data as a parameter, in response to determining that the text data is used for the setting parameter, wherein:

determining the type of processing and the command corresponding to the type of processing is performed based on a rule stored in a memory, wherein the rule further includes information for designating a parameter to be set in correspondence to the command.

* * * * *